(12) United States Patent
Auerbach et al.

(10) Patent No.: US 11,803,195 B2
(45) Date of Patent: *Oct. 31, 2023

(54) ELECTRICAL VERTICAL TAKE-OFF AND LANDING AIRCRAFT HAVING REVERSIONARY FLIGHT CONTROL AND METHOD OF USE

(71) Applicant: BETA AIR, LLC, South Burlington, VT (US)

(72) Inventors: Joshua E. Auerbach, South Burlington, VT (US); Andrew Giroux, Georgia, VT (US); Chris Townsend, Shelburne, VT (US); Timothy Gerard Richter, Wynantskill, NY (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,888

(22) Filed: May 16, 2022

(65) Prior Publication Data

US 2022/0404842 A1 Dec. 22, 2022

Related U.S. Application Data

(63) Continuation of application No. 17/349,144, filed on Jun. 16, 2021, now Pat. No. 11,353,890.

(51) Int. Cl.
*G01R 31/3181* (2006.01)
*B60W 10/20* (2006.01)
(Continued)

(52) U.S. Cl.
CPC ............. *G05D 1/102* (2013.01); *B64C 13/18* (2013.01); *B64D 27/24* (2013.01); *B64D 45/00* (2013.01); *G05D 1/0022* (2013.01)

(58) Field of Classification Search
CPC .... G05D 1/102; G05D 1/0088; G05D 1/0061; G05D 1/0022; B62K 11/007;
(Continued)

(56) References Cited

U.S. PATENT DOCUMENTS 9,979,463 B1 * 5/2018 Shafer ................. A01M 31/002
10,099,705 B2 * 10/2018 Letwin ................ B60W 50/082
(Continued)

*Primary Examiner* — Yuri Kan
(74) *Attorney, Agent, or Firm* — CALDWELL INTELLECTUAL PROPERTY LAW

(57) ABSTRACT

Aspects relate to methods and systems for reversionary flight control for an electrical vertical take-off and landing (eVTOL) aircraft. An exemplary system includes a pilot control, a sensor configured to sense and transmit analog control data associated with a pilot interaction with the pilot control, a pilot interface module configured to receive the analog control data, convert the analog control data to digital control data, and transmit digital control, an actuator, and a flight controller. The flight controller may be configured to receive the digital control data, determine a primary command datum as a function of the digital control data, transmit the primary command datum to the actuator, determine that the digital control signal is non-functional, receive the analog control data, determine a reversionary command datum as a function of the analog control data, and transmit the reversionary command datum to the actuator.

20 Claims, 9 Drawing Sheets

(51) Int. Cl.
*G05D 1/10* (2006.01)
*G05D 1/00* (2006.01)
*B64D 27/24* (2006.01)
*B64D 45/00* (2006.01)
*B64C 13/18* (2006.01)

(58) Field of Classification Search
CPC ... A01M 31/002; B60W 10/20; B64C 39/024; B64C 29/0083; B64C 25/34; G01R 31/3181; A01D 34/84; B60Q 1/1484; B60R 25/406; G01S 7/28; G06F 3/011
See application file for complete search history.

(56) References Cited

U.S. PATENT DOCUMENTS

| | | | |
|---|---|---|---|
| 11,137,832 B2* | 10/2021 | Katz | G06F 3/011 |
| 11,353,890 B1* | 6/2022 | Auerbach | G05D 1/0022 |
| 2014/0222246 A1* | 8/2014 | Mohamadi | G01S 7/28 |
| | | | 701/2 |
| 2015/0012154 A1* | 1/2015 | Senkel | B64C 25/34 |
| | | | 701/4 |
| 2015/0183482 A1* | 7/2015 | Kubo | B62K 11/007 |
| | | | 180/209 |
| 2015/0286216 A1* | 10/2015 | Miwa | G05D 1/0088 |
| | | | 701/4 |
| 2017/0032603 A1* | 2/2017 | Koizumi | B60R 25/406 |
| 2018/0032200 A1* | 2/2018 | Hong | B60Q 1/1484 |
| 2018/0035606 A1* | 2/2018 | Burdoucci | A01D 34/84 |
| 2019/0375495 A1* | 12/2019 | Pfammatter | B64C 29/0083 |
| 2020/0073786 A1* | 3/2020 | Schat | G01R 31/3181 |
| 2020/0354049 A1* | 11/2020 | Noppel | B64C 39/024 |
| 2021/0291832 A1* | 9/2021 | Simmons | B60W 10/20 |

* cited by examiner

ELECTRICAL VERTICAL TAKE-OFF AND LANDING AIRCRAFT HAVING REVERSIONARY FLIGHT CONTROL AND METHOD OF USE

CROSS-REFERENCE TO RELATED APPLICATIONS

This application is a continuation of Non-provisional application Ser. No. 17/349,144 filed on Jun. 16, 2021, and entitled "ELECTRICAL VERTICAL TAKE-OFF AND LANDING AIRCRAFT HAVING REVERSIONARY FLIGHT CONTROL AND METHOD OF USE," the entirety of which is incorporated herein by reference.

FIELD OF THE INVENTION

The present invention generally relates to the field of computerized vehicle controls and navigation. In particular, the present invention is directed to systems and methods for reversionary flight control on an electrical vertical take-off and landing (eVTOL) aircraft.

BACKGROUND

Fly-by-wire, where electronics mediate flight controls, is used more frequently in modern aviation. Commonly, provisions exist for flight controls on conventional fixed-wing aircraft to experience a reversion back to manual controls in case of an emergency affecting function of a fly-by-wire flight controller. Fixed-wing aircraft have control systems which can be understood and controlled by a human pilot. Therefore, reversion to a manual control system grants a pilot an opportunity to control her aircraft, albeit in an impaired state, when a flight controller experiences a malfunction. Conversely, many vertical take-off and landing (VTOL) aircraft, such as quadcopters and the like, require the use of flight control systems which must be implemented by way of a computer and cannot be controlled directly by a human pilot. Failure of flight control systems in these aircraft does not permit a flight control reversion allowing the pilot to control her aircraft.

SUMMARY OF THE DISCLOSURE

In an aspect a system for reversionary flight control for an electrical vertical take-off and landing (eVTOL) aircraft includes a pilot control and at least a sensor configured to sense analog control data associated with a pilot interaction with the pilot control and transmit analog control data by way of an analog control signal. The system further including a plurality of redundant flight controllers, wherein the plurality of redundant flight controllers includes at least a first redundant flight controller communicative with the at least a sensor and configured to receive the analog control data by way of the analog control signal, convert the analog control signal to a digital control signal, and transmit digital control data by way of the digital control signal, at least an actuator, and at least a second redundant flight controller communicative with the at least a sensor, the at least a pilot interface module, and the at least an actuator, where the second redundant flight controller is configured to receive the digital control data by way of the digital control signal, determine a primary command datum as a function of the digital control data, transmit the primary command datum to the at least an actuator, determine that the digital control signal is non-functional, receive the analog control data by way of the analog control signal, determine a reversionary command datum as a function of the analog control data, and transmit the reversionary command datum to the at least an actuator.

In another aspect a method of reversionary flight control for an electrical vertical take-off and landing (eVTOL) aircraft includes sensing, using at least a sensor, analog control data associated with a pilot interaction with a pilot control, transmitting, using the at least a sensor, the analog control data by way of an analog control signal, receiving, using a first redundant flight controller communicative with the at least a sensor, the analog control data by way of the analog control signal, converting, using the first redundant flight controller, the analog control signal to a digital control signal, transmitting, using the first redundant flight controller, digital control data by way of the digital control signal, receiving, using a second redundant flight controller communicative with the at least a sensor, the at least a first redundant flight controller, and at least an actuator, the digital control data by way of the digital control signal, determining, using the flight controller, a primary command datum as a function of the digital control data, transmitting, using the second redundant flight controller, the primary command datum to the at least an actuator, determining, using the second redundant flight controller, that the digital control signal is non-functional, receiving, using the flight controller, the analog control data by way of the analog control signal, determining, using the second redundant flight controller, a reversionary command datum as a function of the analog control data, and transmitting, using the second redundant flight controller, the reversionary command datum to the at least an actuator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for flight control reversion. In an embodiment, fly-by-wire flight control reversion may be employed in an electric vertical take-off and landing (VTOL) aircraft. Flight control reversion is currently available for many fly-by-wire fixed wing aircraft, but not on VTOL aircraft. This failing must be addressed in order for VTOL aircraft to satisfy the exceptional safety standards the public has come to expect in air travel.

Aspects of the present disclosure can be used to ensure pilot flight control when communication of digital data between pilot controls and a flight controller malfunctions. Aspects of the present disclosure can also be used to allow redundant communication of pilot control data with a flight controller. This is so, at least in part, because flight controller failure poses a risk to air travel, which is especially dire with VTOL and eVTOL aircraft.

Aspects of the present disclosure allow for reversion of flight controls in case of a malfunction in communication between pilot controls and a flight controller. Exemplary embodiments illustrating aspects of the present disclosure are described below in the context of several specific examples.

Figure 1:
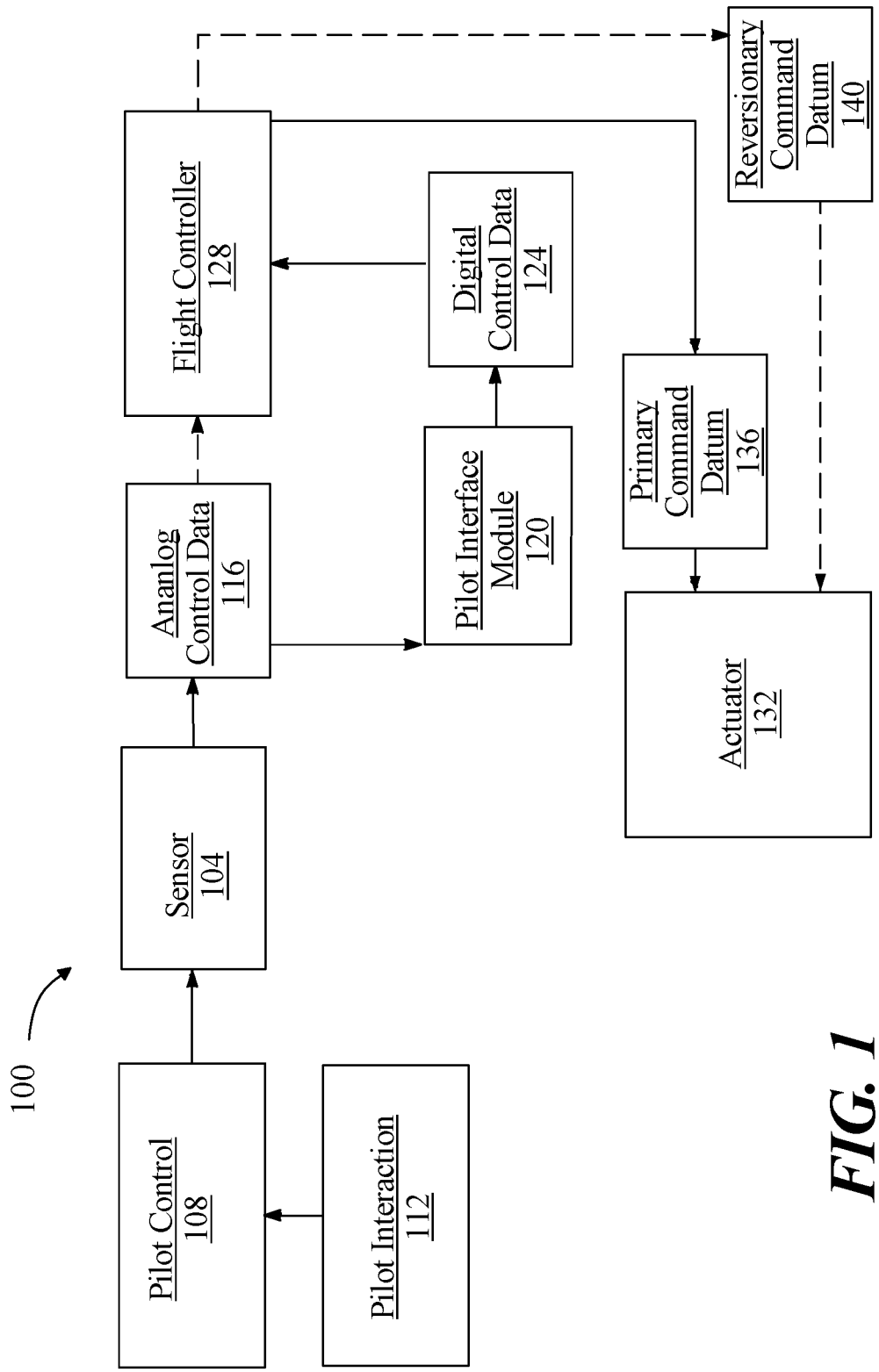
FIG. 1 is a block diagram illustrating an exemplary system for reversionary flight control.

Referring now to FIG. 1, exemplary system 100 for reversionary flight control configured for use in an electric vertical take-off and landing (eVTOL) aircraft is illustrated in block diagram form. System 100 includes at least a sensor 104. At least a sensor 104 may be communicatively coupled to at least a pilot control 108. Communicative coupling may include two or more components being electrically, or otherwise connected and configured to transmit and receive signals from one another. Signals may include electrical, electromagnetic, visual, audio, radio waves, or another undisclosed signal type alone or in combination. At least a sensor 104 communicatively coupled to at least a pilot control 108 may include at least a sensor disposed on, near, around or within at least pilot control 108. Plurality of sensors 104 may include a motion sensor. "Motion sensor," in this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Non-limiting exemplary motion sensors may include magnetic encoders, quadrature sensors, optical encoders, Hall effect sensors, and the like. At least a sensor 104 may include any of torque sensor, gyroscope, accelerometer, torque sensor, magnetometer, inertial measurement unit (IMU), pressure sensor, force sensor, proximity sensor, displacement sensor, vibration sensor, among others. Plurality of sensors 104 may include a sensor suite which may include a plurality of sensors that may sense similar or dissimilar phenomenon. For example, in a non-limiting embodiment, sensor suite may include a plurality of accelerometers, a mixture of accelerometers and gyroscopes, or a mixture of an accelerometer, gyroscope, and torque sensor. At least a sensor 104 may include a plurality of sensors in a form of individual sensors or a sensor suite working in tandem or individually. A sensor suite may include a plurality of independent sensors, as described herein, where any number of the sensors may be used to detect any number of physical or electrical quantities associated with a pilot control 108. Independent sensors may include separate sensors measuring physical or electrical quantities that may be powered by and/or in communication with circuits independently, where each sensor may output to a common circuit. In an embodiment, use of a plurality of independent sensors may result in redundancy configured to employ more than one sensor that measures substantially similar phenomenon. Redundant sensors may be of a same type or a combination of different types; so should one sensor fail; the redundant sensors may continue to sense a phenomenon. At least a sensor 104 may be configured to sense a pilot interaction 112 from at least pilot control 108. As used in this disclosure, a "pilot control" is any pilot interface for inputting control data. As used in this disclosure, a "pilot interaction" is any manipulation or interfacing a pilot makes with a pilot control 108, for example to communicate a desired control of an aircraft. At least pilot control 108 may include a throttle lever, inceptor stick, collective pitch control, steering wheel, brake pedals, pedal controls, toggles, joystick, and the like. One of ordinary skill in the art, upon reading the entirety of this disclosure would appreciate a variety of pilot input controls that may be present in an electric aircraft consistent with the present disclosure. Inceptor stick may be consistent with disclosure of an inceptor stick in U.S. patent application Ser. No. 17/001,845 entitled "A HOVER AND THRUST CONTROL ASSEMBLY FOR DUAL-MODE AIRCRAFT," which is incorporated herein by reference in its entirety. Collective pitch control may be consistent with disclosure of a collective pitch control in U.S. patent application Ser. No. 16/929,206 entitled "HOVER AND THRUST CONTROL ASSEMBLY FOR DUAL-MODE AIRCRAFT," which is incorporated herein by reference in its entirety. At least pilot control 108 may be physically located in a cockpit of an aircraft or remotely located outside of the aircraft in another location communicatively coupled to at least a portion of the aircraft. "Communicatively coupled," as used in this disclosure, is a process whereby one device, component, or circuit is able to receive data from and/or transmit data to another device, component, or circuit; communicative coupling may be performed by wired or wireless electronic communication, either directly or by way of one or more intervening devices or components. In an embodiment, communicative coupling includes electrically coupling an output of one device, component, or circuit to an input of another device, component, or circuit. Communicative coupling may be performed via a bus or other facility for intercommunication between elements of a computing device. Communicative coupling may include indirect connections via "wireless" connection, low power wide area network, radio communication, optical communication, magnetic, capacitive, or optical coupling, or the like. At least a pilot control 108 may include buttons, switches, or other binary inputs. Additionally or alternatively, at least a pilot control 108 may include digital controls or analog controls. At least a pilot control 108 may be configured to receive pilot interaction 112. Pilot interaction 112 may include a physical manipulation of a control, such as without limitation a pilot using a hand and arm to push or pull a lever, or a pilot using a finger to manipulate a switch. Pilot interaction 112 may include a voice command by a pilot to a microphone and computing system consistent with the entirety of this disclosure.

With continued reference to FIG. 1, at least a sensor 104 may be configured to sense, for example as a function of pilot interaction 112, analog control data 116. As described in this disclosure, "analog control data" is information associated with pilot control, such as control data, that is represented by way of an analog signal, for example an analog control signal. "Control data," as used in this disclosure is information representing a pilot interaction 112 with a pilot control 108, for example control data may represent at least a desired control of any element of an aircraft. In some cases, control data may include a pilot signal as described in greater detail below, for example in reference to FIG. 6. Alternatively or additionally, in some embodiments, control data may include a representation of at least an element of data correlated to a remote input. Remote inputs may be received from at least a remote device as described in greater detail below, for example in reference to FIG. 6. Further still, in some embodiments, control data may represent an automated input. Automated inputs may be provided by a flight controller operating in an autonomous mode or autonomous function as described in greater detail below, for example in reference to FIG. 6. For example without limitation, analog control data 116 may represent a desired change in aircraft conditions or flight control parameters. A "datum", for the purposes of this disclosure, refers to at least an element of data. In some cases, a datum may identify a pilot interaction 112. At least a pilot control 108 may be communicatively coupled to any other component presented in system 100; communicative coupling may include redundant connections, for instance which may be configured to safeguard against single-point failure. Pilot interaction 112 may indicate a pilot's desire to change heading or trim of an electric aircraft. Pilot interaction 112 may indicate a pilot's desire to change an aircraft's pitch, roll, yaw, or throttle. "Pitch," as used in this disclosure is an aircraft's angle of attack; the angle of attack may be approximated as a difference between the aircraft's attitude and the aircraft's horizontal flight trajectory. For example, an aircraft pitches "up" when its nose is angled upward compared to horizontal flight, for example while in a climb maneuver. In another example, the aircraft pitches "down", when its nose is angled downward compared to horizontal flight, for example while in a dive maneuver. "Roll," as used in this disclosure, refers to an aircraft's position about its longitudinal axis, running from its tail to its nose. "Yaw," as described in this disclosure, is an aircraft's turn angle, when an aircraft rotates about an imaginary vertical axis intersecting the center of the earth and a fuselage of the aircraft. "Throttle," as used in this disclosure, is an amount of thrust from a propulsor. Pilot interaction 112, when referring to throttle, may refer to a pilot's desire to increase or decrease thrust produced by at least a propulsor. Analog control data 116 may include at least an electrical signal. Electrical signals may include analog signals, digital signals, periodic or aperiodic signals, step signals, unit impulse signals, unit ramp signals, unit parabolic signals, one or more signum functions, exponential signals, rectangular signals, triangular signals, sinusoidal signals, one or more sinc functions, pulse width modulated signals, or the like. At least a sensor 104 may include circuitry, computing devices, electronic components or a combination thereof that translates pilot interaction 112 into analog control data 116 configured to be transmitted to another electronic component.

Still referring to FIG. 1, in some cases, analog control data 116 is communicated by way of an analog signal. As used in this disclosure, an "analog control signal" is an analog signal that contains data representative of a pilot control, for example analog control data 116. Analog control data 116 may be communicated by way of analog control signal to a pilot interface module 120. As used in this disclosure, a "pilot interface module" is a device that takes as input at least signal representative of a pilot's interaction 112 with a pilot control 108 from at least a sensor 104 and outputs a digital data as a function of the input. In some cases, pilot interface module 120 may include at least an analog to digital converter (ADC). In some cases, a pilot interface module 120 may take as input at least an analog control signal and output at least a digital control signal. Pilot interface module 120 may convert analog control data 116 to digital control data 124. Conversion of analog control data 116 may include digitization, for example by way of at least an analog to digital converter. In some cases, analog control data 116 may include a continuously variable electrical potential indicative of pilot interaction 112. Analog control data 116 may be additionally processed, for example by way of pilot interface module or flight controller, by way of an analog to digital converter (ADC) as well as any additionally circuitry, such as without limitation a Wheatstone bridge, an amplifier, a filter, and the like. For instance, in some cases, sensor 104 may comprise a strain gage configured to determine loading of pilot control 108. Strain gage may be included within a circuit comprising a Wheatstone bridge, an amplifier, and a bandpass filter to provide an analog strain measurement signal having a high signal to noise ratio, which characterizes strain resulting from pilot interactions 112. An ADC may then digitize analog control signal 116 producing a digital signal that can then be transmitted other systems, for instance without limitation a computing system, a pilot display, and a memory component. Alternatively or additionally, sensor 104 may sense a pilot interaction 112 digitally and convert a digital signal to an analog control signal 116, for example by way of a digital to analog converter. For instance in some embodiments, sensor 104 may sense a characteristic through a digital means or digitize a sensed signal natively. In some cases, for example, sensor 104 may include a rotational encoder and be configured to sense a rotational speed or position of a rotor; in this case, the rotational encoder digitally may sense rotational "clicks" by any known method, such as without limitation magnetically, optically, and the like.

Figure 8:
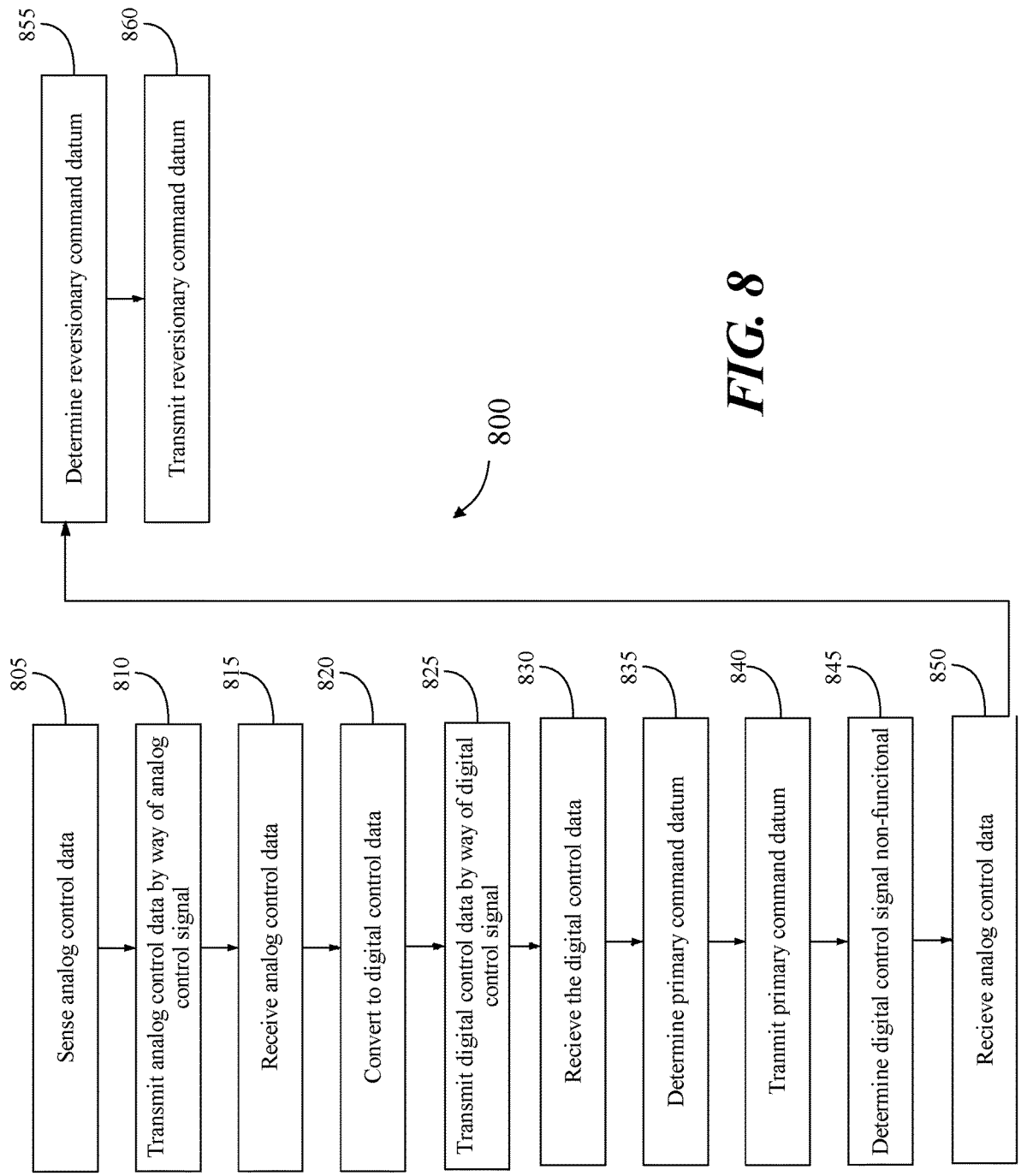
FIG. 8 is a flow diagram illustrating an exemplary method of reversionary flight control.

In some cases, pilot interface module 120 may include at least a computing device, for example any computing device described in this disclosure, such as without limitation in reference to FIG. 8. For example, pilot interface module 120 may include an application specific integrated circuit (ASIC) and/or a field-programmable gate array (FPGA). Pilot interface module 120 may transmit digital control data 124 by way of a digital control signal to a flight controller 128. As described in this disclosure, "digital control data" is information associated with pilot control that is represented by way of a digital signal, for example a digital control signal. As used in this disclosure, a "digital control signal" is a signal that transmits, encodes, or otherwise represents digital control data. In some embodiments, pilot control may be remote from aircraft and analog control data 116 may be transmitted by way of an analog control signal that is communicated wirelessly. According to some embodiments, an analog control signal may be communicated wirelessly. For example, an analog control signal may be communicated by way of radio. A most common and non-limiting example of wireless communication of an analog signal is amplitude-modulated and frequency-modulated (AM and FM) radio. Analog control signal may be communicated by way of any analog transmission method. Analog transmission may include modulation of one or more of amplitude, phase, or some other property in proportion to analog control data being communicated. In some cases, analog transmission may include passband data transmission using a digital modulation method such as a sinewave modulated by a digital bit-stream. In some cases, a wireless analog transmission may include use of electromagnetic radiation, such as without limitation radio and/or optical signals.

With continued reference to FIG. 1, system 100 may include a flight controller 128. Flight controller 128 may be communicatively coupled to at least a pilot interface module 120, at least a sensor 104, and at least an actuator 132. Flight controller 128 may be any flight controller described in this disclosure, for example without limitation in reference to FIGS. 5-6. Communicative coupling may be consistent with any embodiment of communicative coupling as described herein. According to some embodiments, flight controller 128 may be configured to perform a voting algorithm. Flight controller, in some instances, may be a component or grouping of components that controls one or more actuators of an aircraft by taking in signals from a pilot and/or remote device and outputting signals to the one or more actuators. In some cases, one more actuators may include at least a propulsor, at least a control elements, and the like. Flight controller 128 may mix, refine, adjust, redirect, combine, separate, or perform other types of signal operations to translate pilot desired trajectory into aircraft maneuvers. Flight controller 128 may condition signals such that they can be sent and received by various components throughout an aircraft.

With continued reference to FIG. 1, flight controller 128 may include and/or communicate with any computing device, including without limitation a microcontroller, microprocessor, digital signal processor (DSP) and/or system on a chip (SoC). Flight controller may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller 128 may be designed and configured to operate aircraft via fly-by-wire. With continued reference to FIG. 1, flight controller 128 may be configured to receive digital flight control data 124, for example by way of a digital control signal. Flight controller 128 may determine primary command datum 136 according to any method described in this disclosure, for example without limitation in reference to FIGS. 2-7. As used in this disclosure, a "primary command datum" is a command datum that, if functional, is used first by an actuator. As used in this disclosure a "command datum" is any element of information that indicates a purposeful state of change of state of a control element, flight component, or actuator. According to some embodiments, at least a propulsor may be controlled by an actuator 132. Flight controller 128 may be communicatively coupled to at least a propulsor 132. In some embodiments, flight controller 128 may be communicatively coupled to each propulsor 132; so, the flight controller 128 may transmit at least a command datum to each propulsor and each propulsor may be configured to modify an aspect of propulsor behavior in response to the command datums. As a non-limiting example, flight controller 128 may transmit at least a command datum to a propulsor via an electrical circuit connecting flight controller to the propulsor 132; the electrical circuit may include a direct conductive path from the flight controller 128 to the propulsor 132 or may include an isolated coupling such as an optical or inductive coupling. A command datum may be determined according to any known flight control methods. Exemplary flight control methods are included in entitled U.S. patent application Ser. No. 17/218,428 entitled "METHODS AND SYSTEMS FOR FLIGHT CONTROL CONFIGURED FOR USE IN AN ELECTRIC AIRCRAFT," by N. Moy et al., incorporated herein by reference.

With continued reference to FIG. 1, in some embodiments, flight controller 128 may be configured to determine if a signal or data is non-functional. For example, flight controller 128 may determine that a digital control signal and/or a digital control data is non-functional. As used in this disclosure, a signal is "functional" if it reliably communicates data that is meaningfully representative. In contrast, as used in this disclosure, a signal is "non-functional" if the signal is unreliable in its communication of data or if said data is not meaningfully representative. In some cases, once digital control data 124 is determined to be non-functional, flight controller 128 may revert to another flight control method and use analog control data 116. In some cases, analog control data 116 may be communicated to flight controller 128 by way of an analog control signal. Flight controller 128 may receive analog control data 116 by way of at least an analog input, for example through an analog to digital converted. In some cases, flight controller 128 may additionally process analog control data prior to digitization. For example, analog control data 116 may be amplified, filtered, rectified and the like. In some embodiments, flight controller may be further configured to filter analog control data 116. Analog control data 116 may undergo any signal processing, analysis, and/or filtering described in this disclosure. In some cases, a flight controller 128 may perform one or more signal processing steps on analog control data 116. For instance, sensor may analyze, modify, and/or synthesize a signal representative of control data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal. In some cases, analog control data 116 may be converted, for example to a digital signal or data in a spectral domain, in order to be processed. In some embodiments flight controller 128 may be calibrate analog control data 116, for example according to known calibration methods. Calibration may include determining extreme measurements for analog control data 116 (e.g., sensor minimum and sensor maximum) and scaling analog control data 116 as a function of the extreme measurements. In some cases, flight controller 128 may debounce analog control data 116, according to known debounce methods.

Continuing in reference to FIG. 1, flight controller 128 may use analog control data 116 to determine a reversionary command datum 140. Flight controller 128 may use any method described herein for determination of a command datum, including methods described in reference to FIGS. 2-7. As used in this disclosure, a "reversionary command datum" is a command datum that is used by an actuator as part of a reversion, for example if a primary command datum is non-functional. As used in this disclosure, a "reversion" is a change in control method for an aircraft. In some cases, a reversion may revert a control method to a less automated and/or more manual flight control method, for example in an emergent situation. In some cases, flight controller 128 may transmit reversionary control by transmitting a primary command datum 136 to at least an actuator 132; primary command datum 136 may be derived from digital control data 124 from a pilot interface module 120. Alternatively or additionally, in cases, where digital control data 124 is deemed non-functional, flight controller 128 may transmit a reversionary command datum 140 to at least an actuator 132; reversionary command datum 140 may be and/or be derived from analog control data 116 that has been input directly to flight controller 128. A reversionary command datum may be determined according to any known flight control methods. Exemplary flight control methods are included in entitled U.S. patent application Ser. No. 17/218, 428 entitled "METHODS AND SYSTEMS FOR FLIGHT CONTROL CONFIGURED FOR USE IN AN ELECTRIC AIRCRAFT," by N. Moy et al., incorporated herein by reference. In some cases, a reversionary command datum may be determined by flight controller as a function of analog control data 116, for example instead of digital control data 124. In some cases, flight controller 128 may first convert analog control data 116 into a digital values, for example without limitation by using a analog-to-digital converter, and then use the converted analog control data 116 to determine reversionary command datum 140.

Within continued reference to FIG. 1, system 100 may include at least actuator 132. According to some embodiments at least an actuator 132 may be communicatively coupled to flight controller 128 and a control element of the aircraft. As used in this disclosure, an "actuator" is a system and/or component that that affects an aircraft component, for example affects a movement of a flight component, control element, or any other physical component of an aircraft. An actuator 132 may include an electro-mechanical or an opto-mechanical system. An actuator may include a computing device or plurality of computing devices consistent with the entirety of this disclosure. An actuator may be designed and/or configured to perform any method, method step, or sequence of method steps in any embodiment described in this disclosure, in any order and with any degree of repetition. For instance, an actuator may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. An actuator 132 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Within continued reference to FIG. 1, at least n actuator 132 may include a piston and cylinder system configured to utilize hydraulic pressure to extend and retract a piston coupled to at least a portion of aircraft. At least an actuator 132 may include a stepper motor or server motor configured to utilize electrical energy into movement of a rotor. At least an actuator 132 may include a system of gears coupled to a motor configured to convert electrical energy into kinetic energy and mechanical movement through a system of gears. At least an actuator 132 may include components, processors, computing devices, or the like configured to detect a control element. At least an actuator 132 may be configured to move at least a portion of aircraft as a function of command datum for example a primary command datum 136 and/or a reversionary command datum 140. As defined above a command datum may include any element of information that indicates a purposeful state of change of state of a control element, flight component, or actuator 132. A command datum may indicate a desired change in aircraft heading or thrust. According to some embodiments, a command datum may be derived from pilot interaction 112 and analog control data 116, for example without limitation by performing a control algorithm. A control algorithm may include any control algorithm described in this disclosure, for example with reference to FIGS. 2-7. That is to say command datum may be derived from a pilot interaction 112, for example without limitation in a form of moving an inceptor stick; and the command datum may be received by at least an actuator 132 that in turn, actuates according to the command datum, for instance thereby moving at least a portion of aircraft, to accomplish a pilot's desired maneuver.

With continued reference to FIG. 1, in some embodiments, an actuator 132 may be configured to move control surfaces and/or control elements of aircraft in one or both of its two main modes of locomotion, or adjust thrust produced at any propulsor. A "control element," as described in this disclosure is any element that can interact with forces to move an aircraft. Non-limiting exemplary control elements include control surfaces, hot-air balloons, rockets, and jets. A "control surface," as described in this disclosure, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, propulsors, or any other mechanical surface are used to control an aircraft in a fluid medium. Persons skilled in the art, upon reviewing the entirety of this disclosure, will be aware of various mechanical linkages that may be used as a control surface, as used, and described in this disclosure.

With continued reference to FIG. 1, flight controller 128 may communicate with at least an actuator 132 using wireless communication, such as without limitation communication performed using electromagnetic radiation including optical and/or radio communication, or communication via magnetic or capacitive coupling. In some cases, flight controller 128 may be fully incorporated in an aircraft and may be a remotely accessible by a remote device that may operate the aircraft remotely via wireless or radio signals. Alternatively or additionally, a computing device in aircraft may be configured to perform some steps or actions described herein while a remote device is configured to perform other steps. Persons skilled in the art will be aware, after reviewing the entirety of this disclosure, of many different forms and protocols of communication that may be used to communicatively couple flight controller 128 to one or more actuators 132.

With continued reference to FIG. 1, a system for reversionary flight control 100 may include at least an actuator 132 communicative with flight controller 128. In some cases, at least an actuator 132 may be configured to receive at least one of a primary command datum 136 and a reversionary command datum 140. Primary command datum 136 and/or reversionary command datum 140 may include any command datum described in this disclosure. At least an actuator 132 may actuate at least a control element according to a control datum. Control element may include any control element described in this disclosure. For instance, in some embodiments, a control element may include one or more components of a propulsor.

Within continued reference to FIG. 1, according to some embodiments, flight controller 128 and/or pilot interface module 120 may perform a voting process. Voting is described in detail below. In some embodiments, at least an actuator 132 may be configured to control at least a flight element, Flight element may include any flight element described in this disclosure, for example with reference to FIGS. 2-7. According to some embodiments, at least an actuator may be contingently operative based upon at least one of a primary command datum 136 and a reversionary command datum 140. For instance, in some cases, at least an actuator 132 may determine a command datum is non-functional and select to not control a flight element with a non-functional command datum, as a result of that determination. Determination of functionality may be according to any method consistent with this disclosure, for example an absence of a command datum and/or an unreliable signal delivering the command datum may be indications of non-functionality. In some embodiments, at least an actuator 132 may be configured to receive primary command datum 136 and reversionary command datum 140, determine the primary command datum 136 is non-functional, and control at least a control element as a function of the reversionary command datum 140. Actuator 132 may control at least a control element according to any actuator control consistent with this disclosure. Alternatively or additionally, in some versions, at least an actuator 132 may be further configured to determine primary command datum 136 is functional and control at least a control element as a function of the primary command datum 136.

Still referring to FIG. 1, in some embodiments, at least an actuator 132 may include a propulsor. A propulsor may be configured to generate propulsion for an eVTOL aircraft. In some versions, a propulsor may include an inverter and an electrical motor, where the inverter is configured to drive the electrical motor. In some cases, inverter may receive primary command datum 136 and/or reversionary command datum 140. In some cases, inverter may control propulsor as a function of at least one of primary command datum 136 and/or reversionary control datum 140. For example, in some cases, inverter may control electrical motor based upon at least one of primary command datum 136 and/or reversionary control datum 140. Inverter may include any inverter consistent with this disclosure, for example inverters taught with reference to FIG. 4.

Still referring to FIG. 1, in some embodiments, flight controller 128 may be further configured to determine at least one of primary command datum 136 and reversionary command 140 datum as a function of an inertial compensation algorithm. An inertial compensation algorithm may be used to generate a reversionary command 140 datum based upon a measured/calculated inertia of one or more propulsors. An inertial compensation algorithm may include an inertia compensator. An inertia compensator as described herein may be implemented in any one or more separate subsystems separate from any mixer as described herein and operate similarly to any inertia compensator implemented in a mixer. An inertia compensator may include one or more computing devices, an electrical component, circuitry, one or more logic circuits or processors, or the like, which may be configured to compensate for inertia in one or more propulsors present in system. Mixer may be configured, in general, to output signals and command propulsors to produce a certain amount of torque; however, real-world propulsors contain mass, and therefore have inertia. "Inertia," for the purposes of this disclosure, is a property of matter by which it continues in its existing state of rest or uniform motion in a straight line, unless that state may be changed by an external force. Specifically, in this case, a massive object requires more force or torque to start motion than may be required to continue producing torque. In a control system, mixer must therefore modulate the would-be signal to account for inertia of the physical system being commanded. The inertia compensator may make appropriate calculations based on modified attitude command, output torque command, and other considerations like environmental conditions, available power, vehicle torque limits, among others. Inertia compensator may adjust vehicle torque limits for certain periods of time wherein, for example, output torque command may be allowed to overspeed a propulsor to start the propulsor's rotating physical components and then quickly step down the torque as required to maintain the commanded torque. The inertia compensator which may include a lead filter. Additional disclosure related to inertia compensation may be found in U.S. patent application Ser. No. 17/218,428 filed Mar. 31, 2021, entitled "METHODS AND SYSTEMS FOR FLIGHT CONTROL CONFIGURED FOR USE IN AN ELECTRIC AIRCRAFT," by N. Moy et al., incorporated in its entirety herein by reference.

Still referring to FIG. 1, in some embodiments, flight controller 128 and or pilot interface module may be configured to filter control data, for example analog control data and/or digital control data by performing a voting process. As used in this disclosure, a "voting process" is any process that includes derivation, calculation, and/or execution of a voting algorithm. Voting algorithm may include any voting algorithm described in this disclosure, for example without limitation voting algorithms described in reference to FIGS. 2-3.

Still referring to FIG. 1, in some embodiments, flight controller 128 may be further configured to determine an autonomous command datum through autonomous function of the flight controller and transmit the autonomous command datum to at least an actuator 132. At least an actuator 132 may then in turn control at least a control element as a function of autonomous command datum. As used in this disclosure, an "autonomous command datum" is a command datum that has been determined using an autonomous function of flight controller, or flight controller operating in an autonomous mode.

With continued reference to FIG. 1, at least an actuator may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. At least an actuator may include a single computing device operating independently, or may include two or more computing device operating in concert, in parallel, sequentially or the like; two or more computing devices may be included together in a single computing device or in two or more computing devices. At least an actuator may interface or communicate with one or more additional computing devices as described below in further detail via a network interface device. Network interface device may be utilized for connecting at least an actuator to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least an actuator may include but is not limited to, for example, a computing device or cluster of computing devices in a first location and a second computing device or cluster of computing devices in a second location. At least an actuator may include one or more computing devices dedicated to data storage, security, distribution of traffic for load balancing, and the like. At least an actuator may distribute one or more computing tasks as described below across a plurality of computing devices of computing device, which may operate in parallel, in series, redundantly, or in any other manner used for distribution of tasks or memory between computing devices. At least an actuator may be implemented using a "shared nothing" architecture in which data is cached at the worker, in an embodiment, this may enable scalability of actuator and/or computing device.

At least an actuator may be designed and/or configured to perform any method, method step, or sequence of method steps in any embodiment described in this disclosure, in any order and with any degree of repetition. For instance, at least an actuator may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least an actuator may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Actuator, as well as any other component present within disclosed systems, as well as any other components or combination of components may be connected to a controller area network (CAN) which may interconnect all components for signal transmission and reception.

Still referring to FIG. 1, according to some embodiments, at least an actuator or flight controller 128 may be configured to perform a voting algorithm. In some cases, performing voting algorithm includes determining that at least a sensor of a plurality of sensors 104 is an allowed sensor 104. Voting algorithm may also be configured to translate pilot input 112 into commands suitable for movement of control surfaces mechanically coupled to an aircraft. For example, and without limitation, there may be more than one allowed sensor from plurality of sensors 104 with associated control data 116 determined to be active and admissible. Active and/or admissible control data 116 may be received by voting algorithm. Voting algorithm may combine active and/or admissible control data 116 to generate and/or output a command datum; combining may include without limitation any form of mathematical aggregation, such as a sum, a weighted sum, a product, a weighted product, a triangular norm such as a minimum, bounded product, algebraic product, drastic product, or the like, a triangular co-norm such as a maximum, bounded sum, algebraic sum, drastic sum, or the like, an average such as an arithmetic and/or geometric mean, or the like. One of ordinary skill in the art, after reviewing the entirety of this disclosure, would appreciate that averaging (finding the mean) of a plurality datums of controller data 116 from a plurality of allowed sensors 104 is only one example of mathematical or other operations suitable to take all "votes" into account when generating a command datum. An allowed sensor may include a sensor that has not been banned by a flight controller 128 or at least an actuator. One of ordinary skill in the art would appreciate, after reviewing the entirety of this disclosure, that any number of flight controllers can perform any number of the herein disclosed steps in combination with other computing devices or systems and perform these calculations relating to any number of components, banning and unbanning any component in system 100. Flight controller 128 or at least an actuator determines if at least a sensor of plurality of sensors 104 is an allowed sensor by determining if the at least a sensor's corresponding control datum 116 is an active datum. An "active datum," as used in this disclosure, is to a datum which is received by communicatively coupled device within a predetermined and expected time limit. For example and without limitation, flight controller 128 or at least an actuator may calculate when at least a sensor may be expected to transmit a control datum 116; if that control datum 116 arrives outside of an expected time limit (i.e., time range), then the control datum 116 may be determined to not be an active datum. If flight controller 128 or at least an actuator receives a control datum 116 within an expected time range, then the control datum 116 may be determined to be an active datum. Filtering inactive datums may be a safeguard against old or stale data, wherein stale data may be outdated, for instance in view of more recent pilot inputs 112. Flight controller 128 or at least an actuator may perform a voting algorithm in order to determine if a control datum 116 is an admissible datum. An "admissible datum," as used in this disclosure, is an element of data which is within a predetermined and/or expected admissible range. An "admissible range," as used in this disclosure, is control data 116 value that if used to actuate a control surface would result in a movement of the control surface, which is admissible. For instance in some non-limiting embodiments an admissible movement is a movement that is considered safe in view of environmental conditions, aircraft conditions, mission considerations, and/or aircraft power considerations. For example, and without limitation, pilot input 112 may be embodied by a pilot moving an inceptor stick to the right, a plurality of sensors 104 senses a pilot input 112 and transmit control data 116, including a plurality of control datums; a control datum may be transmitted to and determined to be an active datum by flight controller 128 or at least an actuator. Flight controller 128 or at least an actuator may further receive information from onboard and offboard sensors that measure environmental conditions, such as without limitation airspeed, angle of attack, and air density, as well as aircraft conditions like battery level. Flight controller 128 or at least an actuator may perform voting algorithm consistent with any voting algorithm described herein.

With continued reference to FIG. 1, flight controller 128 or at least an algorithm is configured to ban the at least a sensor of plurality of sensors 104 that transmitted a control datum of control data 116 determined to not be an active datum. A "ban," as used in this disclosure, is an exclusion of one or more datums of controller data 116, for example without limitation by flight controller or at least an actuator. For example, and without limitation, flight controller 128 or at least an actuator may ban a bad sensor of plurality of sensors 104 that does not transmit a control datum of control data 116 within a time limit, thereby determining that data from the bad sensor to be not trustworthy and not accurately representative of a pilot input 112. Thresholds relating to voting algorithm and sensor filtering are described in detail in this disclosure, for instance with reference to FIGS. 2-3. Similarly, flight controller 128 or at least an actuator may be configured to ban a bad sensor 104 transmitting a control datum of control data 116, which has been determined not to be an admissible datum. For example, and without limitation, flight controller 128 or at least an actuator may determine a control datum 116 is not representative of an admissible controls surface movement, such as without limitation a movement that correlates to an admissible range of flight maneuvers given a certain engine power availability and air density. Voting algorithm may utilize one or more machine-learning processes consistent with the entirety of this disclosure, and in particular with reference to FIG. 4.

With continued reference to FIG. 1, flight controller 128 or at least an actuator may be configured to generate, as a function of control data 116, a command datum correlated to pilot input 112. Command datum may be an electrical signal consistent with any electrical signal described in this disclosure. Command datum may be an electrical signal generated by flight controller 128 or at least an actuator using control datums that are both active and admissible. According to some embodiments, command datum may be a mean of a plurality of command datums, active datums, admissible datums, or the like, for example being derived from any number of allowed sensors of plurality of sensors 104. For example, and without limitation, at least a sensor of plurality of sensors 104 may include ten independent sensors detecting pilot input 112. Continuing with the example, two of the ten independent sensors may be determined to transmit non-active datums and are thus banned; three additional sensors may be determined to transmit non-admissible datums and are thus banned. In this example, the remaining five allowed sensors may be used to perform one or more mathematical operations on their control datums to output at least a command datum that represents a collective value in some way; hence, in this example, each sensor can be said to have "voted" on what value command datum should be. In some cases, command datum may be a command to move an aileron mechanically coupled to aircraft consistent with this disclosure. In some cases, command datum may be a command to a propulsor mechanically coupled to an electric aircraft, like an electric motor, propeller, combustion engine, or the like.

Figure 2:
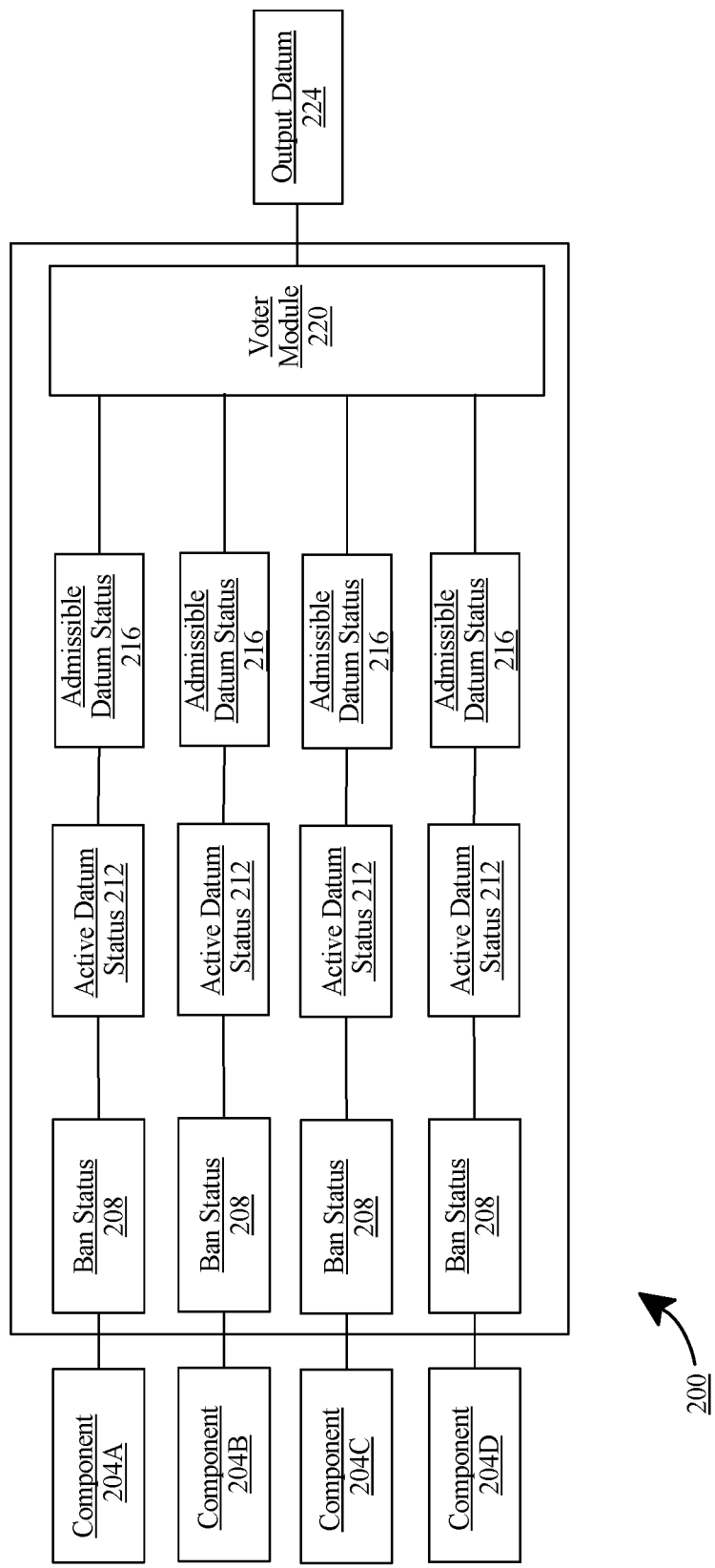
FIG. 2 is a block diagram illustrating an exemplary data filtering algorithm.

Referring now to FIG. 2, an exemplary embodiment of a voting algorithm 200 is presented in block diagram form. Voting algorithm 200 may receive data from component 204A-D. Component 204A-D may include sensors, sensor suites, flight controllers, computing devices, electronic component, or other aircraft component as described herein. For example, and without limitation, component 204A-D, may include four independent sensors, each of which may be at least a sensor 104. In some cases, component 204A may indicate, as an electrical signal or element of data, it is ban status 208. A "ban status," as used this disclosure, is a status of a component within system 100; ban status 208 may be 'banned' or 'unbanned'. If component 204A is banned, its vote may not be counted, as it may not be a sensor whose data is considered usable for generation of a command datum. In some cases, a system that is banned may be unbanned over multiple iterations of banning algorithm, as disclosed in this disclosure. For example, and without limitation, component 204A may not be banned, or in other words, a control datum of control data 116 transmitted by component 204A may be taken into consideration by voting algorithm 200. Unbanned component 204A may then include an active datum status 212. If command datum 116 is transmitted from an unbanned sensor, in the ongoing example component 204A, and is transmitted within a predetermined time limit, time range, speed, or in-line with another or combination of other temporal considerations, active datum status 212 may be determined. Active datum status 212 may include whether or not a control datum was transmitted to flight controller 128 or at least an actuator in a temporally appropriate manner. If so, control datum 116 may be determined to include an admissible datum status 216. In some cases, admissible datum status 216 may include whether control datum 116 is an admissible datum, or that it correlates to an admissible control surface movement. One of ordinary skill in the art would appreciate, after reviewing the entirety of this disclosure, that determination of active datum status 212 and admissible datum status 216 may not necessarily be sequential; that any determinations may be made in any order; that the determinations may be made separately; that same computing devices may be used in the determinations of each status relating to a single component; or, that multiple computing systems may be used in the determination of statuses relating to multiple components.

Continuing to refer to FIG. 2, voting algorithm 200, after determining that control datums relating to allowed components are active datums (at active datum status 212) and admissible datums (at admissible datum status 216), transmits control datums to voter module 220. Voter module 220 may be performed on any computing device or component thereof as described in this disclosure, including without limitation at least an actuator or a flight controller 128. Voter module 220 may be performed using any of an analog circuit, digital circuit, combinatorial logic circuit, sequential logic circuit and/or another circuit suitable, or the like. Voter module 220 may perform any of method steps, operations, calculations, or other manipulations of command datums relating to allowed components 204A-D. Voter module 220, for example, may receive four control datums relating, for example to a change in an aircraft's yaw, as described in this disclosure. Voter module 220 may average control datums and output the average as output datum 224. Output datum 224 would in this case be a mean of all control datums associated with each of allowed components 204A-D. Output datum 224 may, in some cases, be same or similar to command datum. Output datum 224 may be transmitted to any portion of an electric aircraft, including but not limited to computing devices, flight controllers, signal conditioners, actuators, propulsors, control surfaces, or the like.

Figure 3:
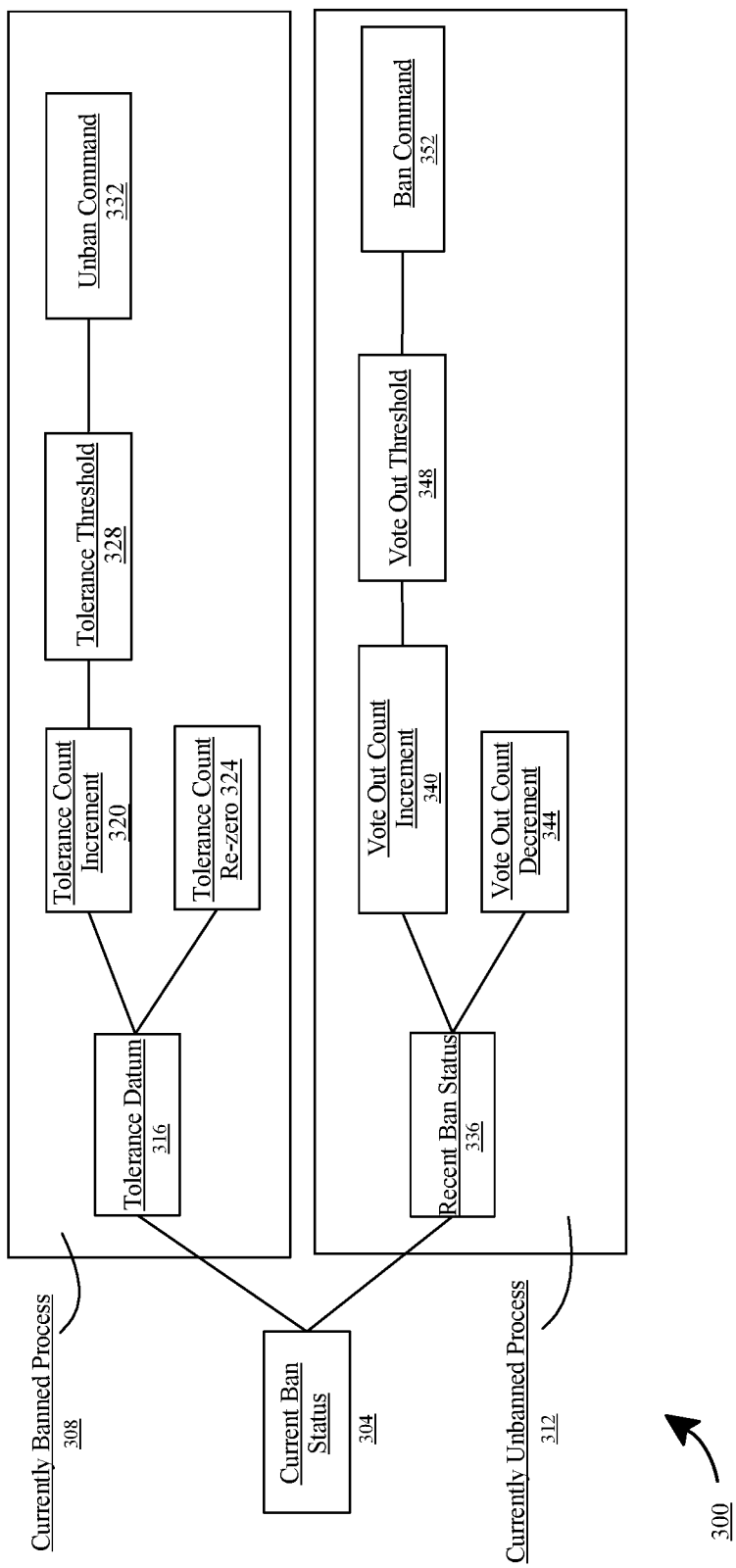
FIG. 3 is a block diagram illustrating an exemplary data filtering algorithm.

Referring now to FIG. 3, an exemplary banning algorithm 300 is presented in block diagram form. Banning algorithm may include current ban status 304. Current ban status 304 may include information or one or more elements of data referring to a component's current status as determined by one or more flight controllers 128 and/or at least an actuator. Current ban status 304 may include a binary value, such as without limitation 1 or 0, indicating currently banned or not currently banned. Current ban status 304 may include an electrical signal representing banned or unbanned status. If current ban status 304 indicates component is currently banned, currently banned process 308 may be initiated. Tolerance datum 316 may be determined by flight controller 128 or at least an actuator as a range of values corresponding to a previously voted on value, such as output datum 224 or command datum. Tolerance datum 316 may be iteratively determined, mathematically manipulated in multiple iterations of a loop, such as in a computer code; or tolerance datum 316 may be input by one or more personnel. Tolerance datum 316 may indicate a range of values acceptable in currently banned process 308. For example, and without limitation, if a currently banned component transmits an electrical signal that does not fall within a previously voted on tolerance datum 316, a tolerance count re-zero 324 may be initiated. Tolerance count re-zero 324 may be a state wherein an iterative process of unbanning a banned component is brought back to zero. If a currently banned component transmits a datum included in tolerance datum 316, then tolerance count increment 320 may be initiated. Tolerance count increment 320 may increase a tolerance count, where a currently banned sensor may be unbanned by provided data that coincides with previously voted on datums. If tolerance count increment 320 increases past a tolerance threshold 328, then the unban command 332 may be initiated. According to some embodiments, tolerance threshold 328 may include a debounce. In some cases, tolerance threshold 328 may have units of iterations or time. For example, and without limitation, tolerance threshold 328 may be five iterations, wherein an iterative process of reading a currently banned component's data must be within tolerance datum 316 five times consecutively before the component is unbanned by unban command 332. Unban command 332 may be transmitted to flight controller 128 or at least an actuator, or directly to the newly unbanned component, like at least a sensor 104.

Figure 4:
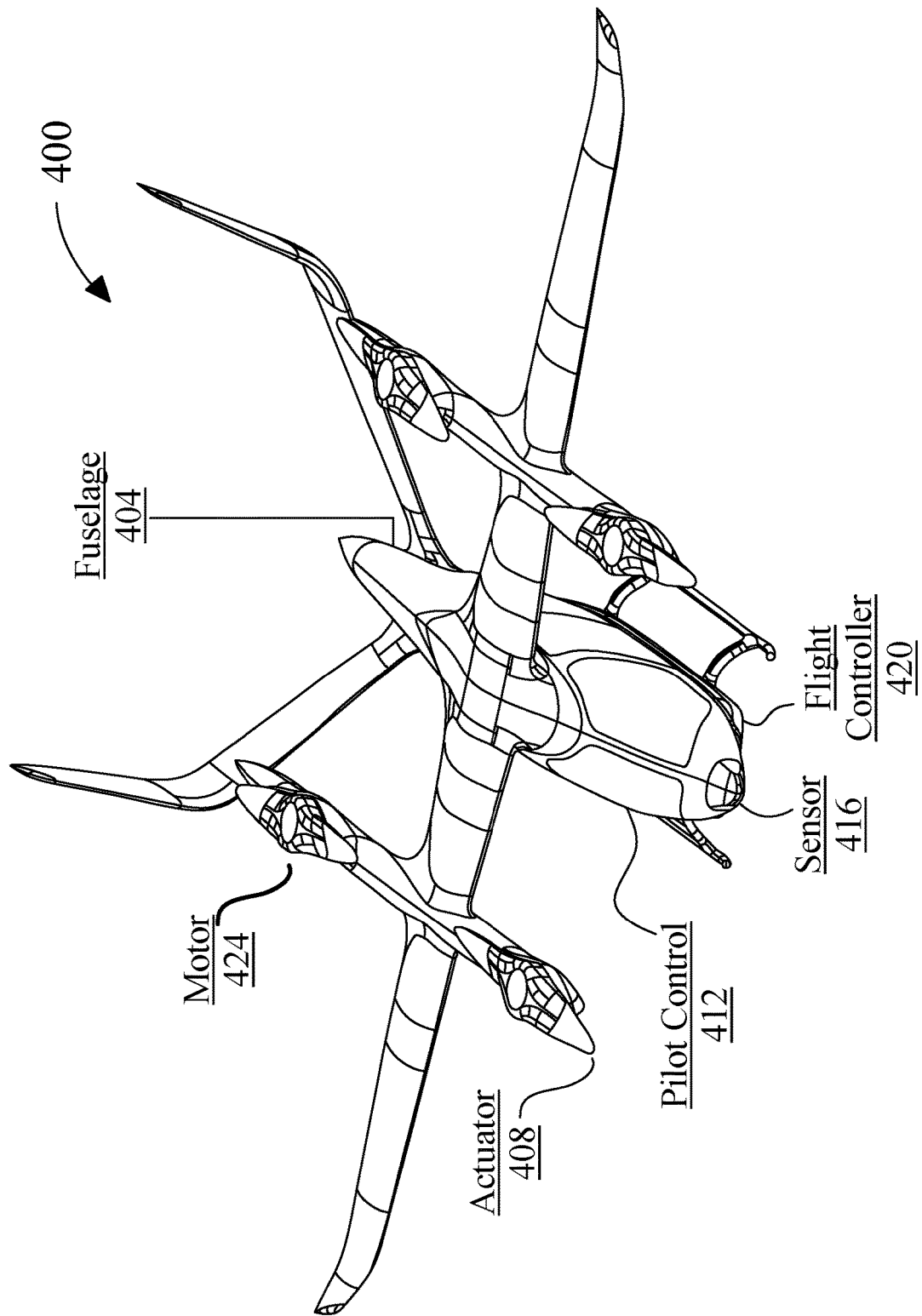
FIG. 4 is a schematic illustrating an exemplary electronic vertical take-off and landing aircraft.

Continuing to refer to FIG. 3, if currently banned status 304 indicates the component is currently unbanned, then currently unbanned process 312 may be initiated. If currently unbanned process 312 is initiated, then recent ban status 336 may be determined. Recent ban status 336 indicates if component was voted out in a previous iteration of signal transmission, i.e., the component was not transmitting active and admissible data consistent with the entirety of this disclosure. If currently unbanned component transmits data out of tolerance with previously voted on data, vote out count increment 340 may be initiated. Vote out count increment 340 may indicate an increase in vote out count, the vote out count, if raised above vote out threshold 348, ban command 352 is initiated. If currently unbanned component has a recently banned status 336 indicating it has not been recently voted out, then vote out count decrement 344 may be initiated. Vote out count decrement 344 decreases vote out count, further removing a currently unbanned component from being banned by ban command 352, indicating that the currently unbanned component is transmitting usable and accurate data. Currently banned process 308 and currently unbanned process 312 may be repeatedly performed before any components are banned or unbanned, performed in periodic intervals, performed in a specific order, performed simultaneously, performed on same components at a same time, performed on all components simultaneously, among others. According to some embodiments, at least an actuator may include an inverter that may be configured to control an electric motor. An electric motor may, in turn, actuate a flight component for example a control surface and/or a propulsor. Referring now to FIG. 4, an exemplary embodiment of an aircraft 400 is illustrated. Aircraft 400 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 4, aircraft 400 may include a fuselage 404. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 404 may comprise structural elements that physically support the shape and structure of an aircraft. Structural elements may take a plurality of forms, alone or in combination with other types. Structural elements may vary depending on the construction type of aircraft and specifically, the fuselage. Fuselage 404 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 4, aircraft 400 may include a plurality of actuators 408. Actuator 408 may include any actuator described in this disclosure, for instance in reference to FIGS. 1-3. In an embodiment, actuator 408 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 4, a plurality of actuators 408 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 108 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 408 may include a rudder, which may include, without limitation, a segmented rudder that produces a torque about a vertical axis. Additionally or alternatively, plurality of actuators 408 may include other flight control surfaces such as propulsors, rotating flight controls, or any other structural features which can adjust movement of aircraft 400. Plurality of actuators 408 may include one or more rotors, turbines, ducted fans, paddle wheels, and/or other components configured to propel a vehicle through a fluid medium including, but not limited to air.

Still referring to FIG. 4, plurality of actuators 408 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 4, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 4, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 4, plurality of actuators 408 may include power sources, control links to one or more elements, fuses, and/or mechanical couplings used to drive and/or control any other flight component. Plurality of actuators 408 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 4, plurality of actuators 408 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 4, an energy source may be used to provide a steady supply of electrical power to a load over a flight by an electric aircraft 400. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 4, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 4, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 4, another exemplary actuator may include landing gear. Landing gear may be used for take-off and/or landing/Landing gear may be used to contact ground while aircraft 400 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 4, aircraft 400 may include a pilot control 412, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 408. For example and without limitation, collective control may alter and/or adjust the pitch angle of all of the main rotor blades collectively. For example, and without limitation pilot control 412 may include a yoke control. As used in this disclosure a "yoke control" is a mechanical control of an aircraft to control the pitch and/or roll. For example and without limitation, yoke control may alter and/or adjust the roll angle of aircraft 400 as a function of controlling and/or maneuvering ailerons. In an embodiment, pilot control 412 may include one or more footbrakes, control sticks, pedals, throttle levels, and the like thereof. In another embodiment, and without limitation, pilot control 412 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 400 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 400 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 4, pilot control 412 may be configured to modify a variable pitch angle. For example, and without limitation, pilot control 412 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 412 may modify the variable pitch angle from a first angle of 2.71° to a second angle of 3.82°. Additionally or alternatively, pilot control 412 may be configured to translate a pilot desired torque for flight component 108. For example, and without limitation, pilot control 412 may translate that a pilot's desired torque for a propeller be 160 lb. ft. of torque. As a further non-limiting example, pilot control 412 may introduce a pilot's desired torque for a propulsor to be 290 lb. ft. of torque. Additional disclosure related to pilot control 412 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 4, aircraft 400 may include a loading system. A loading system may include a system configured to load an aircraft of either cargo or personnel. For instance, some exemplary loading systems may include a swing nose, which is configured to swing the nose of aircraft 100 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 4, aircraft 400 may include a sensor 416. Sensor 416 may include any sensor described in this disclosure, for instance in reference to FIGS. 1-3. Sensor 416 may be configured to sense a characteristic of pilot control 412. Sensor may be a device, module, and/or subsystem, utilizing any hardware, software, and/or any combination thereof to sense a characteristic and/or changes thereof, in an instant environment, for instance without limitation a pilot control 412, which the sensor is proximal to or otherwise in a sensed communication with, and transmit information associated with the characteristic, for instance without limitation digitized data. Sensor 416 may be mechanically and/or communicatively coupled to aircraft 400, including, for instance, to at least a pilot control 412. Sensor 416 may be configured to sense a characteristic associated with at least a pilot control 412. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 416 may include at least a geospatial sensor. Sensor 416 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 100 for both critical and non-critical functions. Sensor may be incorporated into vehicle or aircraft or be remote.

Still referring to FIG. 4, in some embodiments, sensor 416 may be configured to sense a characteristic associated with any pilot control described in this disclosure. Non-limiting examples of a sensor 416 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 416 may sense a characteristic as an analog measurement, for instance, yielding a continuously variable electrical potential indicative of the sensed characteristic. In these cases, sensor 416 may additionally comprise an analog to digital converter (ADC) as well as any additionally circuitry, such as without limitation a Whetstone bridge, an amplifier, a filter, and the like. For instance, in some cases, sensor 416 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 400, for instance without limitation a computing system, a pilot display, and a memory component. Alternatively or additionally, sensor 416 may sense a characteristic of a pilot control 412 digitally. For instance in some embodiments, sensor 416 may sense a characteristic through a digital means or digitize a sensed signal natively. In some cases, for example, sensor 416 may include a rotational encoder and be configured to sense a rotational position of a pilot control; in this case, the rotational encoder digitally may sense rotational "clicks" by any known method, such as without limitation magnetically, optically, and the like.

Still referring to FIG. 4, electric aircraft 400 may include at least a motor 424, which may be mounted on a structural feature of the aircraft. Design of motor 424 may enable it to be installed external to structural member (such as a boom, nacelle, or fuselage) for easy maintenance access and to minimize accessibility requirements for the structure.; this may improve structural efficiency by requiring fewer large holes in the mounting area. In some embodiments, motor 424 may include two main holes in top and bottom of mounting area to access bearing cartridge. Further, a structural feature may include a component of electric aircraft 400. For example, and without limitation structural feature may be any portion of a vehicle incorporating motor 424, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 408. Persons skilled in the art, upon reviewing the entirety of this disclosure, will be aware of various materials, combinations of materials, and/or constructions techniques.

Still referring to FIG. 4, electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft 400 during flight. Forces acting on electric aircraft 400 during flight may include, without limitation, thrust, the forward force produced by the rotating element of the electric aircraft 400 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor 408 of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of electric aircraft 400, including without limitation propulsors and/or propulsion assemblies. In an embodiment, motor 424 may eliminate need for many external structural features that otherwise might be needed to join one component to another component. Motor 424 may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

Figure 5:
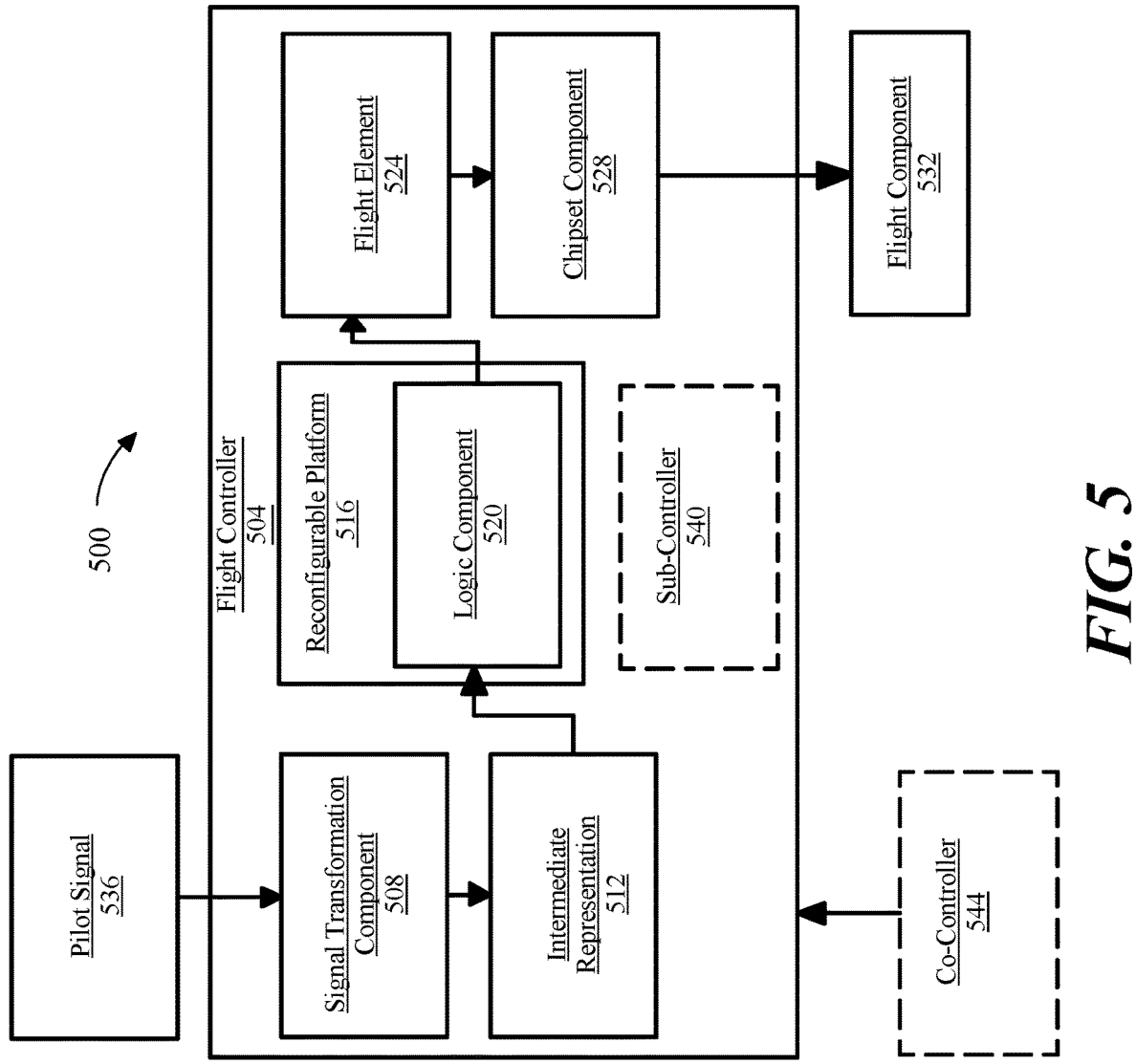
FIG. 5 is a block diagram illustrating an exemplary flight controller.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, such as, in an exemplary embodiment, flight controller 420 in electric aircraft 400 in FIG. 4, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft 500. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft 500 is cruising at an altitude and/or with a sufficient magnitude of forward thrust. As a further non-limiting example, flight status may denote that 500 is building thrust and/or groundspeed velocity in preparation for a takeoff. As a further non-limiting example, flight element 524 may denote that aircraft 500 is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component 532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft 500 automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft 500 and/or the maneuvers of aircraft 500 in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft 500, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft 500. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
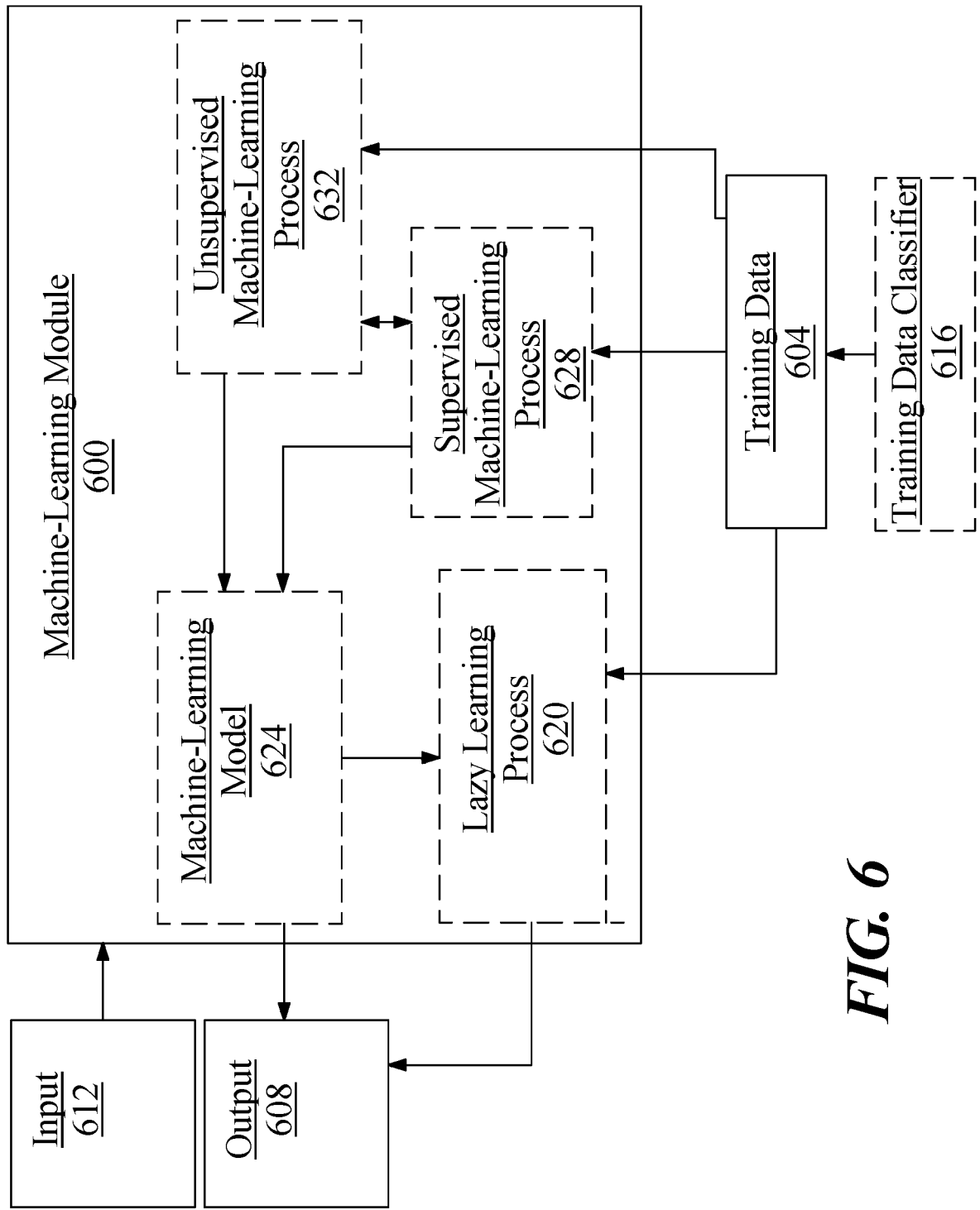
FIG. 6 is a block diagram illustrating an exemplary machine-learning process.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
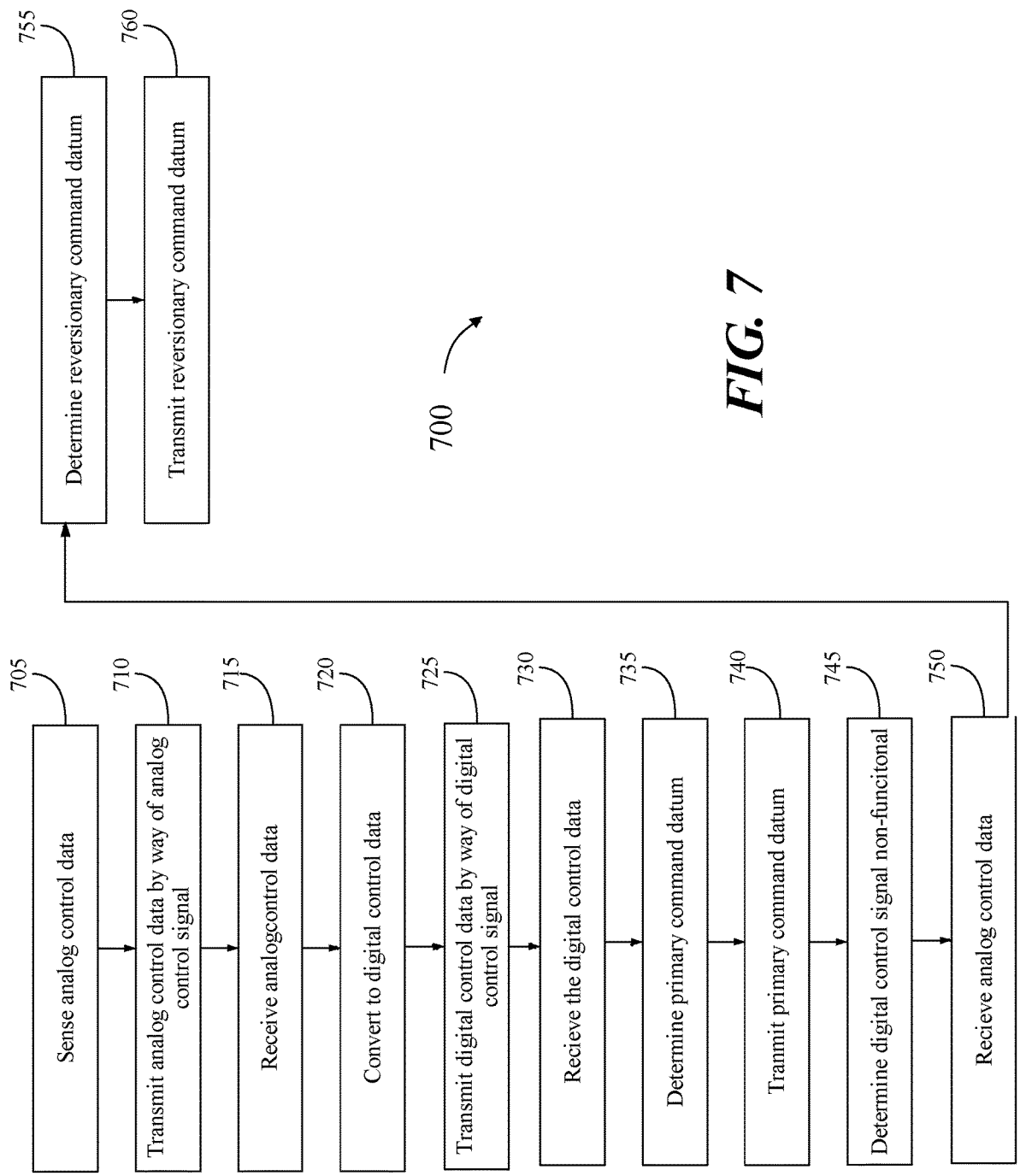
FIG. 7 is a flow diagram illustrating an exemplary method of reversionary flight control.

Referring now to FIG. 7, an exemplary method 700 of reversionary flight control for electrical vertical take-off and landing (eVTOL) aircraft is illustrated by way of a flow diagram. At step 705, at least a sensor may sense analog control data associated with a pilot interaction with a pilot control. At least a sensor may include any sensor described in this disclosure, including for instance in reference to FIGS. 1-6. Analog control data may include any analog control data described in this disclosure, including for instance in reference to FIGS. 1-6. Pilot control may include any pilot control described in this disclosure, including for instance in reference to FIGS. 1-6. Pilot interaction may include any pilot interaction described in this disclosure, for example with reference to FIGS. 1-6. In some embodiments, pilot control may include a collective. A collective may include any collective described in this disclosure, for example with reference to FIGS. 1-6. In some embodiments, pilot control may be remote from aircraft and analog control signal may be communicated wirelessly.

Continuing with reference to FIG. 7, at step 710, at least a sensor may transmit analog control data by way of an analog control signal. Transmission may include any transmission or communication methods described in this disclosure, including in reference to FIGS. 1-6. Analog control signal may include any analog control signal described in this disclosure, for example with reference to FIGS. 1-6.

Continuing with reference to FIG. 7, at step 715, a pilot interface module communicative with at least a sensor may receive analog control data by way of analog control signal. Pilot interface module may include any pilot interface module described in this disclosure, including in reference to FIGS. 1-6.

Continuing with reference to FIG. 7, at step 720, pilot interface module may convert, analog control signal to a digital control signal. Digital control signal may include any digital control signal described in this disclosure, including for instance in reference to FIGS. 1-6. Conversion may include any conversion described in this disclosure, including for instance in reference to FIGS. 1-6.

Continuing with reference to FIG. 7, at step 725, pilot interface module may transmit digital control data by way of digital control signal. Digital control data may include any digital control data described in this disclosure, including in reference to FIGS. 1-6.

Continuing with reference to FIG. 7, at step 730, flight controller may receive digital control signal. Flight controller may be communicative with at least a sensor, at least a pilot interface module, and at least an actuator. Flight controller may include any flight controller described in this disclosure, for example with reference to FIGS. 1-6. At least an actuator may include any actuator described in this disclosure, for example with reference to FIGS. 1-6.

Continuing with reference to FIG. 7, at step 735, flight controller may determine a primary command datum as a function of digital control data. Primary command datum may include any command datum described in this disclosure, for example with reference to FIGS. 1-6. At step 740, flight controller may transmit primary command datum to at least an actuator.

Continuing with reference to FIG. 7, at step 745, flight controller may determine that digital control signal is non-functional. Non-functionality may be determined according to any description of non-functionality in this disclosure, for example with reference to FIGS. 1-6.

Continuing with reference to FIG. 7, at step 750, flight controller may receive, using the analog control data by way of analog control signal. At step 755, flight controller may determine a reversionary command datum as a function of analog control data. Reversionary command datum may include any command datum described in this disclosure, for example with reference to FIGS. 1-6. At step 760, flight controller may transmit reversionary command datum to at least an actuator.

Still referring to FIG. 7, in some embodiments, method 700 may additionally include generating, using a propulsor of at least an actuator, propulsion for the eVTOL aircraft, receiving, using an inverter of the at least an actuator, primary command datum and reversionary command datum, and controlling, using the inverter, the propulsor as a function of at least one of the primary command datum and the reversionary command datum. Propulsor may include any propulsor described in this disclosure, for example with reference to FIGS. 1-6. Inverter may include any inverter described in this disclosure, for example with reference to FIGS. 1-6.

Still referring to FIG. 7, in some embodiments, method 700 may additionally include determining, using flight controller, at least one of primary command datum and reversionary command datum as a function of an inertial compensation algorithm. Inertial compensation algorithm may include any inertial compensation algorithm described in this disclosure, for example with reference to FIGS. 1-6.

Still referring to FIG. 7, in some embodiments, method 700 may additionally include filtering, using flight controller, analog control data. Filtering may include any filtering or signal processing method described in this disclosure, for example with reference to FIGS. 1-6. In some cases, filtering control data may additionally include performing a voting process. Voting process may include any voting process described in this disclosure, for example with reference to FIGS. 1-6.

Still referring to FIG. 7, in some embodiments, method 700 may additionally include determining, using flight controller, an autonomous command datum through autonomous function of the flight controller, and transmitting, using the flight controller, the autonomous command datum to at least an actuator. Autonomous command data may include any autonomous command datum described in this disclosure, including for example with reference to FIGS. 1-6. Autonomous function may include any autonomous function described in this disclosure, including for example with reference to FIGS. 1-6.

Still referring to FIG. 7, in some embodiments, method 700 may additionally include receiving, using at least an actuator, primary command datum and reversionary command datum, determining, using the at least an actuator, the primary command datum is non-functional, and controlling, using the at least an actuator, at least a control element as a function of the reversionary command datum. In some cases, method 700 additionally includes determining, using at least an actuator, primary command datum is functional, and controlling, using the at least an actuator, at least a control element as a function of the primary command datum.

Referring now to FIG. 8, an exemplary method 800 of reversionary flight control for electrical vertical take-off and landing (eVTOL) aircraft is illustrated by way of a flow diagram. At step 805, at least a sensor may sense analog control data associated with a pilot interaction with a pilot control. At least a sensor may include any sensor described in this disclosure, including for instance in reference to FIGS. 1-6. Analog control data may include any analog control data described in this disclosure, including for instance in reference to FIGS. 1-6. Pilot control may include any pilot control described in this disclosure, including for instance in reference to FIGS. 1-6. Pilot interaction may include any pilot interaction described in this disclosure, for example with reference to FIGS. 1-6. In some embodiments, pilot control may include a collective. A collective may include any collective described in this disclosure, for example with reference to FIGS. 1-6. In some embodiments, pilot control may be remote from aircraft and analog control signal may be communicated wirelessly.

Continuing with reference to FIG. 8, at step 810, at least a sensor may transmit analog control data by way of an analog control signal. Transmission may include any transmission or communication methods described in this disclosure, including in reference to FIGS. 1-6. Analog control signal may include any analog control signal described in this disclosure, for example with reference to FIGS. 1-6.

Continuing with reference to FIG. 8, at step 815, at least a first redundant flight controller communicatively connected with at least a sensor may receive analog control data by way of analog control signal. A first redundant flight controller may include any flight controller described in this disclosure, including in reference to FIGS. 1-6.

Continuing with reference to FIG. 8, at step 820, the at least a first redundant flight controller may convert analog control signal to a digital control signal. Digital control signal may include any digital control signal described in this disclosure, including for instance in reference to FIGS. 1-6. Conversion may include any conversion described in this disclosure, including for instance in reference to FIGS. 1-6.

Continuing with reference to FIG. 8, at step 825, the at least a first redundant flight controller may transmit digital control data by way of digital control signal. Digital control data may include any digital control data described in this disclosure, including in reference to FIGS. 1-6.

Continuing with reference to FIG. 8, at step 830, at least a second redundant flight controller may receive digital control signal. At least a second redundant flight controller may be communicatively connected with at least a sensor, at least a first redundant flight controller, and at least an actuator. The at least a second redundant flight controller may include any flight controller described in this disclosure, for example with reference to FIGS. 1-6. At least an actuator may include any actuator described in this disclosure, for example with reference to FIGS. 1-6.

Continuing with reference to FIG. 8, at step 835, the at least a second redundant flight controller may determine a primary command datum as a function of digital control data. Primary command datum may include any command datum described in this disclosure, for example with reference to FIGS. 1-6. At step 840, the at least a second redundant flight controller may transmit primary command datum to at least an actuator.

Continuing with reference to FIG. 8, at step 845, the least a second redundant flight controller may determine that digital control signal is non-functional. Non-functionality may be determined according to any description of non-functionality in this disclosure, for example with reference to FIGS. 1-6.

Continuing with reference to FIG. 8, at step 850, the at least a second redundant flight controller may receive, the analog control data by way of analog control signal. At step 855, the at least a second redundant flight controller may determine a reversionary command datum as a function of analog control data. Reversionary command datum may include any command datum described in this disclosure, for example with reference to FIGS. 1-6. At step 860, flight controller may transmit reversionary command datum to at least an actuator.

Still referring to FIG. 8, in some embodiments, method 800 may additionally include at least an actuator comprises a propulsor configured to generate propulsion for the eVTOL aircraft and an inverter. An inverter may additionally be configured receive the primary command datum and the reversionary command datum and control the propulsor as a function of at least one of the primary command datum and the reversionary command datum. The at least second redundant flight controller may further be configured to determine at least one of the primary command datum and the reversionary command datum as a function of an inertial compensation algorithm. The at least a second redundant flight controller may also be configured to determine at least one of the primary command datum and the reversionary command datum as a function of an inertial compensation algorithm. In other embodiments, the at least a second redundant flight controller is may be configured to filter the analog control data. Filtering the control data may include a performing voting process. The pilot control may comprise a collective. The at least a second redundant flight controller may be configured to determine an autonomous command datum through autonomous function of the flight controller and transmit the autonomous command datum to the at least an actuator. The pilot control may be remote from the aircraft and the analog control signal is communicated wirelessly. At least an actuator may be configured to receive the primary command datum and the reversionary command datum, determine the primary command datum is non-functional, and control at least a control element as a function of the reversionary command datum. At least an actuator may additionally be configured to determine the primary command datum is functional and control the at least a control element as a function of the primary command datum.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
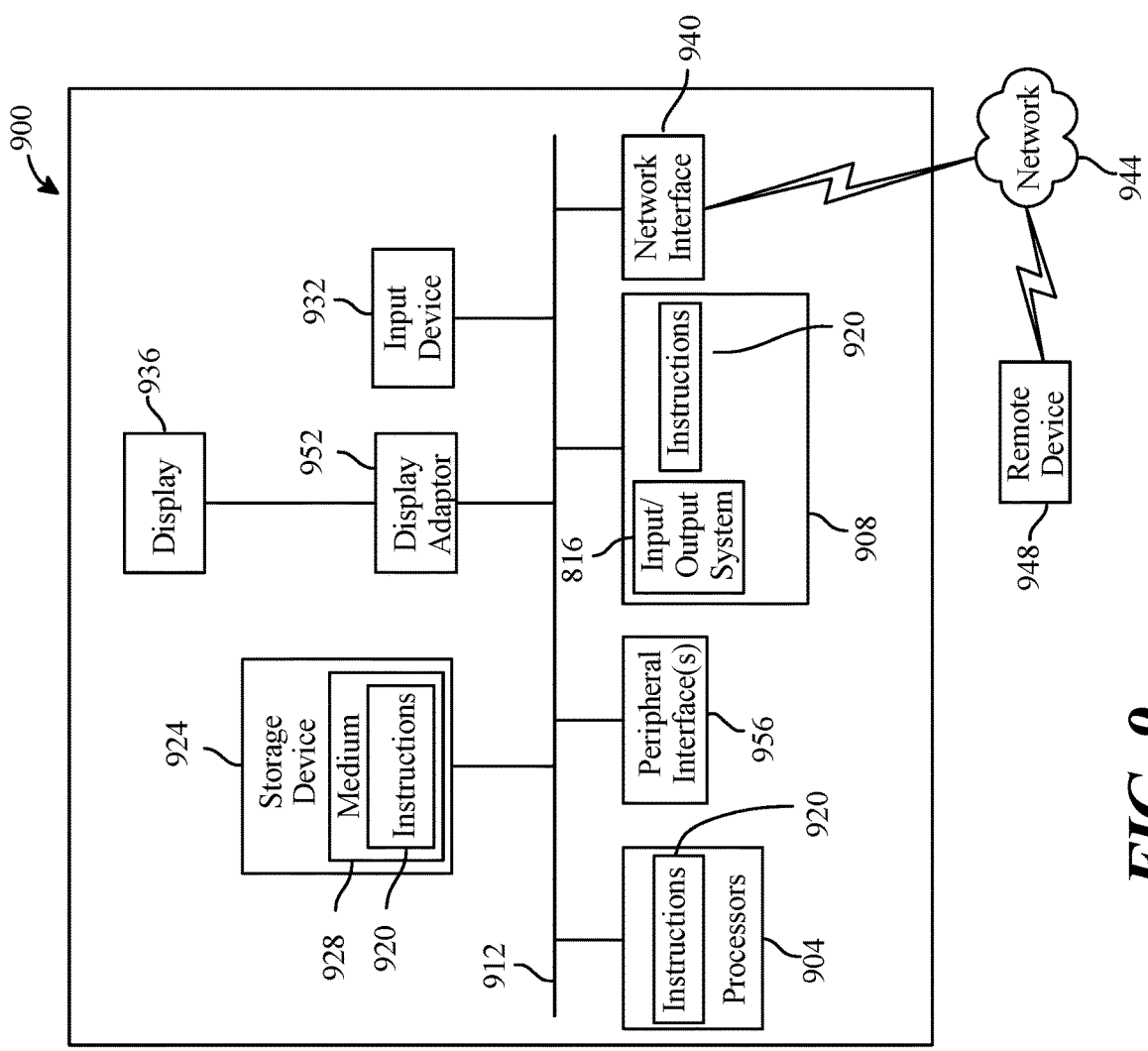
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 929 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for reversionary flight control an electric vertical take-off and landing aircraft, wherein the system comprises:
   a pilot control;
   at least a sensor configured to:
      sense analog control data associated with a pilot interaction with the pilot control; and
      transmit the analog control data by way of an analog control signal;
   at least an actuator; and
   a plurality of redundant flight controllers, wherein the plurality of redundant flight controllers comprises:
      at least a first redundant flight controller communicatively connected with the at least a sensor, wherein the first redundant flight controller is configured to:
         receive the analog control data by way of the analog control signal;
         convert the analog control signal to a digital control signal using a signal transformation component; and
         transmit digital control data by way of the digital control signal;
      at least a second redundant flight controller communicatively connected with the at least a sensor, the at least a first flight controller, and the at least the actuator, wherein the second flight controller is configured to:
         receive the digital control data by way of the digital control signal;
         determine a primary command datum as a function of the digital control data;
         transmit the primary command datum to the at least an actuator;
         determine that the digital control signal is non-functional;
         receive the analog control data by way of the analog control signal if the digital control signal is determined to be non-functional;
         determine a reversionary command datum as a function of the analog control data; and
         transmit the reversionary command datum to the at least the actuator.

2. The system of claim 1, wherein the at least an actuator comprises:
   a propulsor configured to generate propulsion for the electric vertical take-off and landing aircraft; and
   an inverter configured to:
      receive the primary command datum and the reversionary command datum; and
      control the propulsor as a function of at least one of the primary command datum and the reversionary command datum.

3. The system of claim 1, wherein the at least a second redundant flight controller is further configured to determine at least one of the primary command datum and the reversionary command datum as a function of an inertial compensation algorithm.

4. The system of claim 1, wherein the at least a second redundant flight controller is further configured to filter the analog control data.

5. The system of claim 4, wherein filtering the analog control data comprises preforming a voting process.

6. The system of claim 1, wherein the pilot control comprises a collective.

7. The system of claim 1, wherein the at least a second redundant flight controller is further configured to:
   determine an autonomous command datum using an autonomous function of the flight controller; and
   transmit the autonomous command datum to the at least an actuator.

8. The system of claim 1, wherein:
   the pilot control is remote from the aircraft; and
   the analog control signal is communicated wirelessly.

9. The system of claim 1, wherein the at least an actuator is configured to:
   receive the primary command datum and the reversionary command datum;
   determine that the primary command datum is non-functional; and
   control at least a control element as a function of the reversionary command datum.

10. The system of claim 9, wherein the at least an actuator is further configured to:
    determine that the primary command datum is functional; and
    control the at least a control element as a function of the primary command datum.

11. A method of reversionary flight control for electrical vertical take-off and landing (eVTOL) aircraft, wherein the method comprises:
    sensing, using at least a sensor, analog control data associated with a pilot interaction with a pilot control;
    transmitting, using the at least a sensor, the analog control data by way of an analog control signal;
    receiving, using at least a first redundant flight controller communicatively connected with the at least a sensor, the analog control data by way of the analog control signal;
    converting, using at least a first redundant flight controller, the analog control signal to a digital control signal;
    transmitting, using at least a first redundant flight controller, digital control data by way of the digital control signal;
    receiving, using at least a second redundant flight controller communicatively connected with the at least a sensor, the at least a first redundant flight controller, and at least an actuator, the digital control data by way of the digital control signal;
    determining, using the at least a second redundant flight controller, a primary command datum as a function of the digital control data;
    transmitting, using the at least a second redundant flight controller, the primary command datum to the at least an actuator;
    determining, using the at least a second redundant flight controller, that the digital control signal is non-functional;
    receiving, using the at least a second redundant flight controller, the analog control data by way of the analog control signal;
    determining, using the at least a second redundant flight controller, a reversionary command datum as a function of the analog control data; and transmitting, using the at least a second redundant flight controller, the reversionary command datum to the at least an actuator.

12. The method of claim 11, wherein the at least an actuator comprises:
   a propulsor configured to generate propulsion for the electric vertical take-off and landing aircraft; and
   an inverter configured to:
      receive the primary command datum and the reversionary command datum; and
      control the propulsor as a function of at least one of the primary command datum and the reversionary command datum.

13. The method of claim 11, wherein the at least a second redundant flight controller is further configured to determine at least one of the primary command datum and the reversionary command datum as a function of an inertial compensation algorithm.

14. The method of claim 11, wherein the at least a second redundant flight controller is further configured to filter the analog control data.

15. The method of claim 14, wherein filtering the analog control data comprises preforming a voting process.

16. The method of claim 11, wherein the pilot control comprises a collective.

17. The method of claim 11, wherein the at least a second redundant flight controller is further configured to:
   determine an autonomous command datum using an autonomous function of the flight controller; and
   transmit the autonomous command datum to the at least an actuator.

18. The method of claim 11, wherein the pilot control is remote from the aircraft and the analog control signal is communicated wirelessly.

19. The method of claim 11, wherein the at least an actuator is configured to:
   receive the primary command datum and the reversionary command datum;
   determine that the primary command datum is non-functional; and
   control at least a control element as a function of the reversionary command datum.

20. The method of claim 19, wherein the at least an actuator is further configured to:
   determine that the primary command datum is functional; and
   control the at least a control element as a function of the primary command datum.

* * * * *